Nov. 25, 1958   J. J. COURTIN ET AL   2,862,122
SUBMERSIBLE DYNAMOELECTRIC MACHINE
Filed March 14, 1955   2 Sheets-Sheet 1

WITNESSES
Robert C. Baird
Wm. B. Sellers.

INVENTORS
John J. Courtin &
Charles W. Irwin
BY
ATTORNEY

Nov. 25, 1958   J. J. COURTIN ET AL   2,862,122
SUBMERSIBLE DYNAMOELECTRIC MACHINE
Filed March 14, 1955   2 Sheets—Sheet 2

United States Patent Office 2,862,122
Patented Nov. 25, 1958

2,862,122

SUBMERSIBLE DYNAMOELECTRIC MACHINE

John J. Courtin, Buffalo, and Charles W. Irwin, Eggertsville, N. Y., assignors to Westinghouse Electric Corporation, East Pittsburgh, Pa., a corporation of Pennsylvania Application March 14, 1955, Serial No. 494,025

5 Claims. (Cl. 310—87)

The present invention relates to dynamoelectric machines, and more particularly to a machine which is capable of operation submerged in water.

The principal object of the invention is to provide a submersible dynamoelectric machine which is capable of operation submerged in water at any depth and having means for preventing leakage of water into the machine, so that it is suitable for any type of submerged application, or for other uses where it is necessary to prevent leakage of the surrounding medium into the machine.

Another object of the invention is to provide a totally enclosed dynamoelectric machine which is filled with an insulating liquid such as oil, with pressure regulating means for maintaining the liquid under a pressure which is a predetermined amount in excess of the external pressure to which the machine is subjected, so that any leakage will be outward from the machine and it can safely be used submerged in water at any desired depth, or at varying depths.

A further object of the invention is to provide a totally enclosed dynamoelectric machine filled with an insulating liquid, with means for maintaining the liquid under pressure and means for effecting circulation of the liquid to dissipate heat generated in the liquid and in the machine.

Other objects and advantages of the invention will be apparent from the following detailed description, taken in connection with the accompanying drawing, in which.

Figure 1:
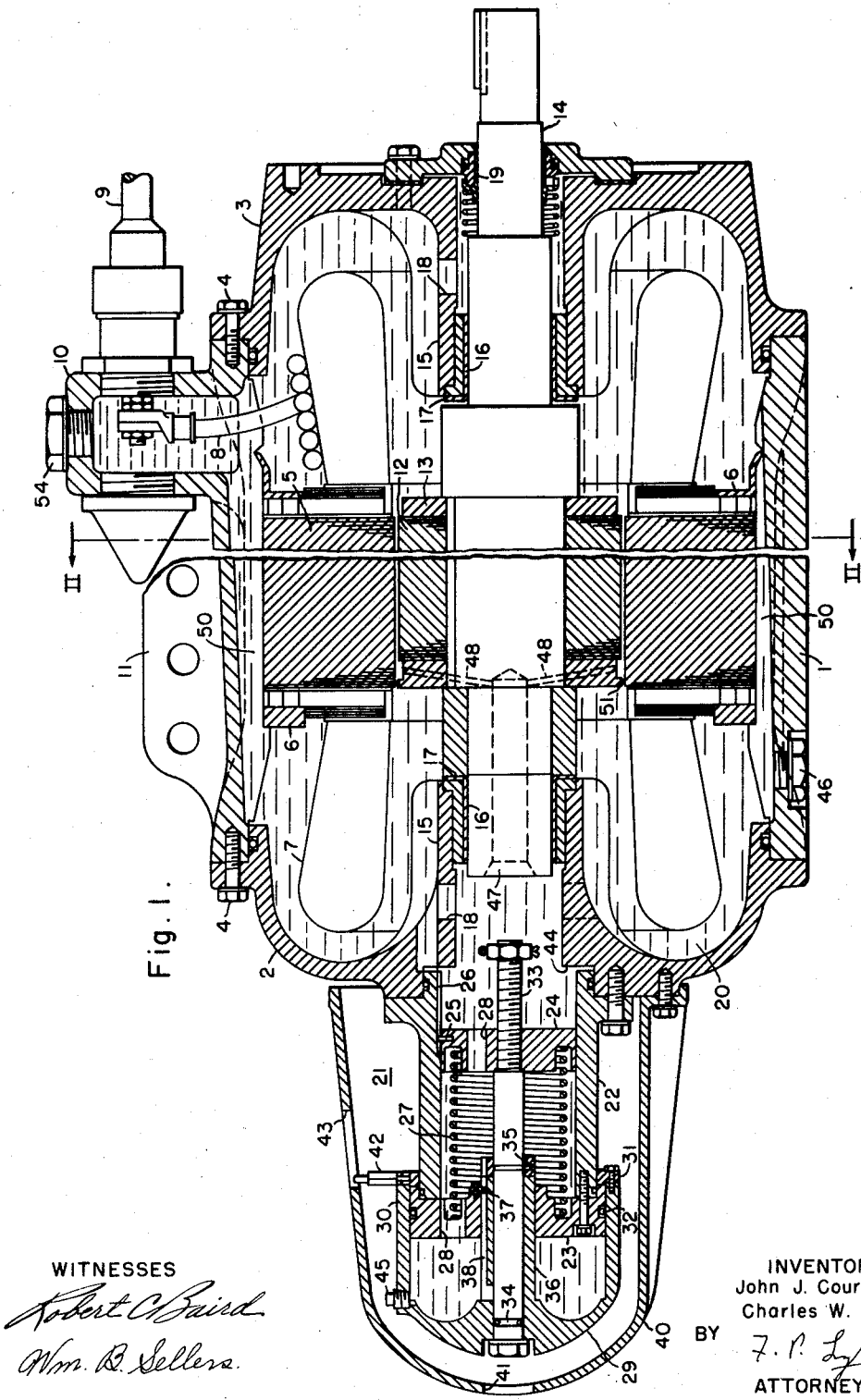
Figure 1 is a longitudinal sectional view of an electric motor embodying the invention.
Figure 2:
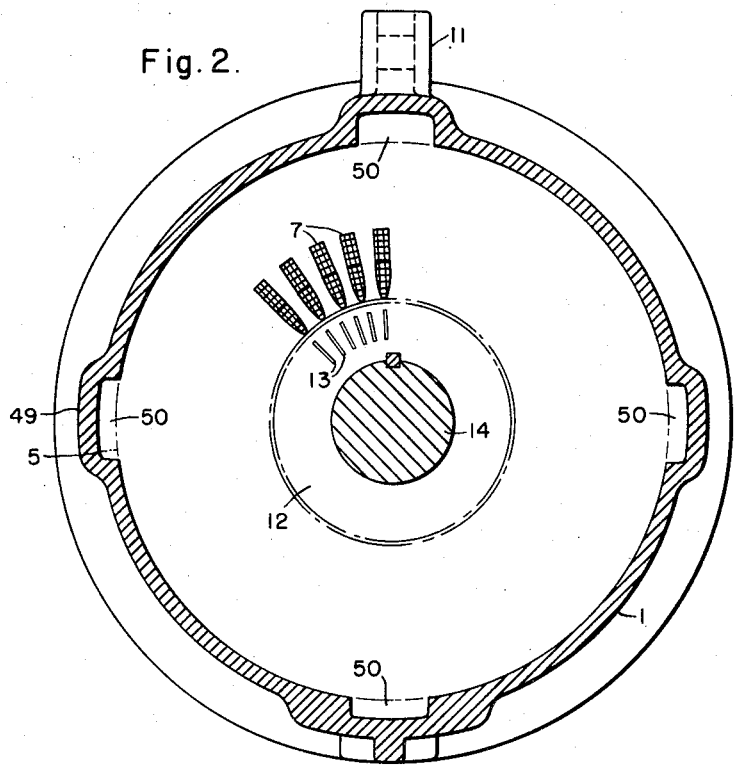
Fig. 2 is a transverse sectional view approximately on the line II—II of Fig. 1.

The invention is applicable to any type of dynamoelectric machine intended for operation submerged in water, and is shown in the drawing embodied in an alternating-current induction motor. The machine shown in the drawing for the purpose of illustration has a generally cylindrical frame member 1 closed at the ends by end brackets 2 and 3, which may be secured to the frame in any suitable manner, as by bolts 4, with substantially liquid-tight joints. The motor has a laminated stator core 5, which may be clamped between end rings 6 of any desired type, and supported in the frame 1 in any suitable or usual manner. Primary windings 7 are placed in slots in the core 5, and electrical connection to the winding is made by means of a cable 8 which is connected to an external cable 9 in a liquid-tight terminal box 10, which may be integral with the frame, the cable 9 being brought into the terminal box 10 through a liquid-tight connection. An external suspension or lifting lug 11 may also be provided on the frame.

The motor has a rotor member including a laminated rotor core 12 carrying a secondary winding of any suitable type, shown as a squirrel-cage winding 13, and secured on a shaft 14. The end brackets 2 and 3 are provided with reentrant tubular portions 15 in which are mounted sleeve bearings 16 for supporting the shaft 14. The bearings 16 are preferably provided with radial thrust bearing surfaces 17 to permit operation of the motor in an inclined position. Openings 18 are provided in the tubular portions 15 to permit free circulation of oil to the bearings for lubrication. The shaft 14 extends out of the machine through the end bracket 3, and a shaft seal 19 of any suitable type is provided to make the opening around the shaft substantially liquid-tight.

It will be seen that the frame 1 and end brackets 2 and 3 constitute a completely closed housing for the machine, and during operation of the motor the housing is completely filled with an insulating liquid 20, preferably a light machine oil. The oil 20 is maintained under pressure so that when the motor is submerged in water, any leakage will be outward from the motor and water is positively prevented from getting into the machine. For this purpose, a pressure regulator 21 is mounted on the end bracket 2, and is designed to maintain the oil under a pressure which is a predetermined amount greater than the external pressure.

Figure 3:
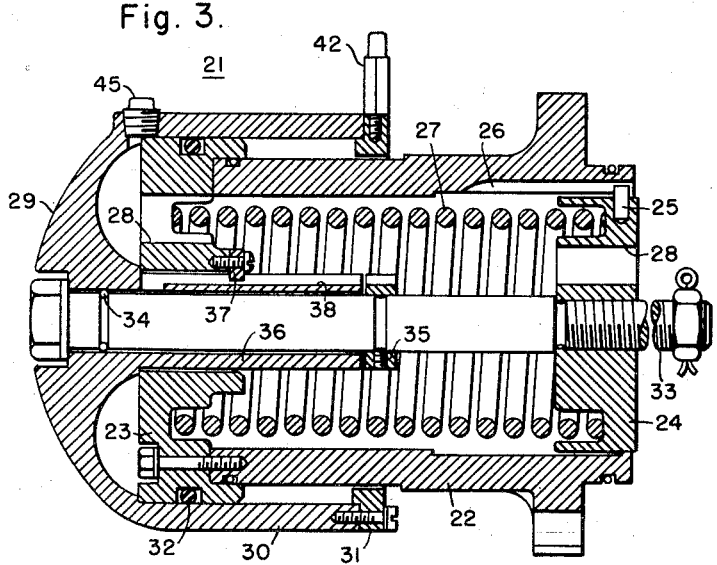
Fig. 3 is a sectional view of a pressure regulator, on a somewhat enlarged scale.

As shown in Figs. 1 and 3, the pressure regulator 21 has a hollow body 22, preferably cylindrical, which is bolted or otherwise mounted on the end bracket 2 with a liquid-tight joint, and which communicates with the interior of the motor through a central opening in the end bracket 2. A stationary spring retainer 23 is mounted on the outer end of the hollow body 22 and a movable spring retainer 24 is axially movable in the body 22, a guide pin 25 on the spring retainer 24 engaging in a groove 26 in the body 22 to prevent rotation of the spring retainer 24. A compression spring 27 is disposed in the body 22 with its ends seated in annular recesses in the spring retainers 23 and 24, so that the movable spring retainer 24 is urged to the right, as viewed in Fig. 1. Both spring retainers are provided with openings 28 to permit free passage of oil through them.

The pressure regulator 21 also includes a movable head 29 which has a cylindrical portion 30 extending over the body 22. A ring 31 is attached to the portion 30, bearing on the body 21, and positioned to engage the fixed spring retainer 23 to limit outward movement of the head 29. The sliding joint between the tubular portion 30 of the head 29 and the outer periphery of the fixed spring retainer 23 is sealed in any suitable manner, as by a sealing ring 32, to prevent leakage of oil. A bolt 33 extends through the head 29 and is threaded into the movable spring retainer 24, as shown, the head of the bolt engaging the head 29 of the pressure regulator and a sealing ring 34 being provided to prevent leakage of oil along the bolt. A collar 35 is secured on the bolt 33 by a set screw, or in any other suitable manner, and engages the end of a central tubular portion 36 of the head 29 to prevent axial movement of the bolt relative to the head. A guide pin 37 may be provided on the fixed spring retainer 23 engaging in a groove 38 in the tubular portion 36 of the head 29 to guide its movement and prevent rotation. An outer cover 40 is secured to the end bracket 2 to protect the pressure regulator 21, the cover 40 being spaced from the bracket to permit free access of the external water to the outside of the pressure regulator, and having a central opening 41 to permit access to the head of the bolt 33.

It will be seen that when the motor and pressure regulator are filled with oil, the compression spring 27 biases the head 29 towards the right, as viewed in Fig. 1, through the movable spring retainer 24 and bolt 33, so that the head applies a pressure to the oil determined by the force of the spring. When the motor is submerged in water, the pressure of the water is applied to the outside of the pressure regulator, and also tends to move the head 29 to the right. Thus, the total pressure applied to the oil in the motor is equal to the sum of the external pressure and the force of the spring. The spring is designed so that its force is substantially constant throughout the normal range of movement of the head 29, and it will be apparent that the internal pressure of the oil in the machine will thus always be maintained at a predetermined amount in excess of the external pressure, so that there will be a constant pressure difference regardless of how much the external pressure may vary. Thus, the motor may be used submerged in water at any depth, or at varying depths, and the internal pressure will always be greater than the external pressure, so that any leakage will be of oil outward from the motor, and leakage of water into the motor is positively prevented.

Since the oil 20, with which the motor is filled, is substantially incompressible, there will be no actual movement of the head 29 of the pressure regulator if there is no leakage from the motor, but the pressure applied to the oil will vary as the external pressure varies, as explained above. In actual practice, of course, it is impossible to make the various joints and seals of the machine absolutely and permanently liquid-tight, and some leakage of oil will occur over a period of time, reducing the amount of oil left in the machine. As such leakage occurs, however, the head 29 will move inward, so that the motor is always maintained solidly filled with oil under positive pressure, and a small amount of leakage has no effect on the machine or on its ability to operate submerged. An indicating pin 42 may be mounted on the tubular portion 30 of the head 29, extending through a slot 43 in the cover 40, so that it can readily be observed to provide a visual indication of the amount of leakage which has taken place from the motor by indicating the position of the head 29.

When a considerable amount of leakage has occurred, the head 29 will eventually reach a position such as shown in Fig. 3 where it engages the fixed spring retainer 23. When this point is reached, or slightly before, it is necessary to refill the motor with oil. For refilling the motor, the pressure of the spring 27 is preferably relieved and the head 29 returned to the position of Fig. 1. This may be done by turning the bolt 33 in a direction to unscrew it from the movable spring retainer 24. The effect of this is to move the spring retainer 24 against the shoulder 44 on the end bracket 2, after which further rotation of the bolt backs off the head 29, by engagement of the collar 35 with the tubular part 36, until the ring 31 engages the stationary spring retainer 23. This relieves the spring pressure and the motor can then be refilled with oil, after which the pressure regulator is restored to operative condition by screwing in the bolt 33 as far as it will go, which draws the movable spring retainer 24 to the position of Fig. 1 with the spring 27 fully compressed.

The motor is filled with oil by means of a filling plug 54 at the top of the terminal box 10, which is the highest point of the motor when in a horizontal position. In order to insure that no pockets of air are trapped in the motor, a vent plug 45 is provided in the tubular portion 30 of the head 29. It will be noted that the position of this vent plug and the design of the motor are such that there are no recesses or pockets at a higher level than the vent plug, so that if the vent plug is removed when filling the motor until oil flows out of the vent, no air can be trapped in the machine. A drain plug 46 may be provided in the bottom of the frame 1 for draining the oil when desired.

Under some conditions, expansion of the oil due to heat in the motor may cause the internal pressure to become undesirably high, and if desired a pressure relief valve of any suitable or usual type might be provided to permit escape of excess oil, thus limiting the maximum internal pressure.

In a liquid-filled machine with the rotor rotating at relatively high speed in the liquid, there is a considerable friction loss which appears in the form of heat in the liquid. In the present construction, means are provided for circulating the oil to dissipate this heat. For this purpose, a central bore 47 is drilled in the end of the shaft 14 within the motor and generally radial passages 48 extend from the inner end of this bore to the surface of the rotor. The passages 48 may extend through the end ring of the squirrel-cage winding at that end of the rotor, as shown, or they might be formed in a separate impeller member, if desired. The frame 1 is provided with external ribs 49 which form internal longitudinal passages 50 at the back of the stator core 5 between the stator core and the frame. When the motor is running, oil is drawn into the bore 47 of the shaft 14 and thrown outward through the passages 48, which serve as an impeller. A lip 51 is formed adjacent the passages 48 which provides a gap between the lip and the stator which is much smaller than the air gap between the stator and rotor. The oil is thus forced to circulate through the air gap between the stator and rotor and through the longitudinal passages 50. Since the motor is normally operated submerged in water, the frame 1 will be cooled by the surrounding water, and thus the heated oil flowing through the passages 50 is cooled and the heat dissipated through the frame. The oil also circulates through the openings 18 to the bearings 16 to lubricate the bearings.

It should now be apparent that a dynamoelectric machine has been provided which is very suitable for operation submerged in water, since any leakage of water into the machine is positively prevented by maintaining the liquid with which the machine is filled always at a pressure a predetermined amount in excess of the external pressure. Such a machine is suitable for numerous applications and can be operated at any depth for which the frame 1 is designed, or at varying depths, since the pressure regulator 21 always maintains a constant pressure difference between the internal and external pressures.

A particular embodiment of the invention has been shown and described for the purpose of illustration, but it is to be understood that the invention may be embodied in other types of machines, and that various modifications and other embodiments are possible within the scope of the invention.

We claim as our invention:

1. A dynamoelectric machine having a stator member and a rotor member, the stator member including a closed liquid-tight housing, the housing being completely filled with an insulating liquid, and pressure regulating means comprising a hollow body mounted on the housing and communicating therewith, a head closing the body and axially movable relative thereto, spring means in the body for applying an axial force to the head to cause the head to apply a predetermined pressure to said liquid contained in the housing and the body, the head being exposed to the external pressure on the machine, whereby the external pressure is added to the pressure due to the spring means, and means in the housing for causing said liquid to circulate between the stator and rotor members.

2. A dynamoelectric machine having a stator member and a rotor member, the stator member including a generally horizontal frame and end brackets closing the ends of the frame, the frame and end brackets forming a liquid-tight housing for the machine, the housing being completely filled with an insulating liquid, a normally closed opening at the top of the frame for filling the housing with said liquid, and pressure regulating means comprising a hollow body mounted on one of the end brackets and communicating with the interior of the housing, a head closing the body and axially movable relative thereto, the head having a normally closed vent opening in the top part thereof, spring means in the body for applying an axial force to the head to cause it to apply pressure to said liquid contained in the housing and the body, the head being exposed to the external pressure on the machine, whereby the external pressure adds to the pressure caused by the spring, and means for relieving the pressure of the spring to facilitate filling the housing with liquid.

3. A dynamoelectric machine having a stator member and a rotor member, said rotor member including a rotor core mounted thereon, the stator member including a generally horizontal frame and end brackets closing the ends of the frame, the frame and end brackets forming a liquid-tight housing for the machine, a stator core supported in the frame, a plurality of longitudinal passages in the frame between the stator core and the surface of the frame, the machine being completely filled with an insulating liquid, means for maintaining said liquid under pressure, and impeller means immediately adjacent said rotor core for causing substantially all of said liquid to flow axially in one direction only through the air gap between the stator and rotor members and through said passages.

4. A dynamoelectric machine having a stator member and a rotor member, the stator member including a generally horizontal frame and end brackets closing the ends of the frame, the frame and end brackets forming a liquid-tight housing for the machine, a stator core supported in the frame, a plurality of longitudinal passages in the frame between the stator core and the surface of the frame, the machine being completely filled with an insulating liquid, means for maintaining said liquid under pressure, the rotor member including a shaft, one end of the shaft terminating within the machine, said end of the shaft having an axial bore therein, and impeller means on the rotor member having generally radial passages communicating with said bore, a circumferential lip on the same end of the rotor member but adjacent to said radial passages providing a smaller gap with the stator than the air gap between the stator core and the rotor member for causing substantially all of said liquid to flow unidirectionally from said impeller means through the air gap and through the longitudinal passages.

5. A dynamoelectric machine having a stator member and a rotor member, the rotor member including an end ring mounted thereon, the stator member including a generally horizontal frame and end brackets closing the ends of the frame, the frame and end brackets forming a liquid-tight housing for the machine, a stator core supported in the frame, a plurality of longitudinal passages in the frame between the stator core and the surface of the frame, the machine being completely filled with an insulating liquid, means for maintaining said liquid under pressure, the end ring including impeller means for causing substantially all of said liquid to flow axially in one direction only through the air gap between the stator and rotor members and through said passages.

References Cited in the file of this patent

UNITED STATES PATENTS

| | | |
|---|---|---|
| 1,531,724 | Arnutonoff | Mar. 31, 1925 |
| 1,750,818 | Sauveur | Mar. 18, 1930 |
| 2,258,064 | Myers | Oct. 7, 1941 |
| 2,301,340 | Spengler | Nov. 10, 1942 |
| 2,492,141 | Gaylord | Dec. 27, 1949 |
| 2,736,825 | Hill | Feb. 28, 1956 |

FOREIGN PATENTS

| | | |
|---|---|---|
| 559,354 | France | June 14, 1923 |
| 1,087,959 | France | Sept. 1, 1954 |